(12) United States Patent
Hashimoto et al.

(10) Patent No.: US 6,334,002 B2
(45) Date of Patent: Dec. 25, 2001

(54) IMAGE READER APPARATUS

(75) Inventors: Nobuo Hashimoto, Ashiya; Toru Ishii, Hirakata; Kenji Nakamura, Takatsuki; Takeshi Ogoshi, Amagasaki; Gen Sasaki, Toyonaka; Takeshi Aoi, Kobe, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/646,810

(22) Filed: May 21, 1996

(30) Foreign Application Priority Data

May 23, 1995 (JP) ............................................. 7-124035

(51) Int. Cl.$^7$ ............................................................ G06K 7/00
(52) U.S. Cl. ............................................ 382/312; 382/321
(58) Field of Search ............................. 382/312, 290, 382/321; 358/483, 486; 348/96, 581; 396/319, 429

(56) References Cited

U.S. PATENT DOCUMENTS

| | | | |
|---|---|---|---|
| 4,682,042 | * | 7/1987 | Igarashi ................................. 358/483 |
| 5,359,677 | * | 10/1994 | Katsurada et al. .................... 382/290 |
| 5,390,032 | * | 2/1995 | Yamamoto et al. .................. 358/486 |
| 5,402,252 | * | 3/1995 | Kojima ................................. 358/486 |
| 5,666,578 | * | 9/1997 | Oikawa et al. ....................... 396/319 |

FOREIGN PATENT DOCUMENTS

| | | | |
|---|---|---|---|
| 4-28187 | 5/1992 | (JP) | ................................. H04N/1/04 |
| 6-237342 | 8/1994 | (JP) | ................................. H04N/1/04 |

OTHER PUBLICATIONS

Tartagni et al., "A Low–Cost Optical Sensor for Precise Position and Motion Estimation of Fast–Moving Objects", 1994, Industrial Electronics, Control and Instrumentation, IEEE, vol. 2, pp. 733–736.*

Sinha et al., "Use of TV Cameras for Robot Position Determination", 1992, Image Processing and Its Applications, IEEE, pp. 567–570.*

\* cited by examiner

*Primary Examiner*—Jose L. Couso
*Assistant Examiner*—Anh Hong Do
(74) *Attorney, Agent, or Firm*—Burns, Doane, Swecker & Mathis, LLP (57) ABSTRACT

An image reader apparatus includes: an image pickup device which is controllably exposed to an object to produce an image signal of the object; a mover which moves the object and the image pickup device relative to each other; a storage operable to store an image signal; a writing device which is operable to write an image signal in the storage; a reading device which is operable to read an image signal from the storage; a discriminator which discriminates whether one of the writing device and the reading device is in operation; and a controller which controls the exposure of the image pickup device in accordance with a result of the discriminator.

45 Claims, 5 Drawing Sheets

IMAGE READER APPARATUS

BACKGROUND OF THE INVENTION

This invention relates to an image reader apparatus for optically reading an image of an object and, more particularly to an image reader apparatus for reading an object image line by line by means of a line sensor in accordance with a command from an external apparatus such as a computer and successively transferring read line data of the image to the external apparatus.

A known image reader apparatus of this type reads an image on a sheet-like medium such as a film image by means of a CCD line sensor. This apparatus operates as follows. The object such as a film is moved by a specified distance corresponding to the width of one line readable by the CCD line sensor. The CCD line sensor reads the image line by line in accordance with an amount of light transmitted through the medium and incident thereupon. A specified processing is applied to image signals each representing one line of image read by the CCD line sensor, and the thus obtained image data are successively transferred to a computer.

In the above prior art apparatus, such image is read by repeatedly moving the medium, after one line of image is read and transferred, to read and transfer a next line of image. Accordingly, it disadvantageously takes a long time to complete the entire reading of an image on a sheet-like medium.

SUMMARY OF THE INVENTION

It is an object of the present invention to provide an image reader apparatus which has overcome the problems residing in the prior art.

It is another object of the present invention to provide an image reader apparatus which can read an object image in a shorter time.

The present invention is directed to an image reader apparatus comprising: an image pickup device which is controllably exposed to an object to produce an image signal of the object; a mover which moves the object and the image pickup device relative to each other; a storage operable to store an image signal; a writing device which is operable to write an image signal in the storage; a reading device which is operable to read an image signal from the storage; a discriminator which discriminates whether one of the writing device and the reading device is in operation; and a controller which controls the exposure of the image pickup device in accordance with a result of the discriminator.

The object may be intermittently moved relative to the image pickup device at a specified interval. The image pickup device may be preferably exposed after an intermittent relative movement is completed.

It may be appreciated that the controller allows the image pickup device to be exposed after an intermittent relative movement is completed when the discriminator discriminates that one of the writing device and the reading device is not in operation, and after one of the writing and the reading is completed when the discriminator discriminates that one of the writing device and the reading device is in operation.

The writing device may be made to write an image signal in the storage during an intermittent relative movement. The object may be film. The image pickup device may be provided with a line sensor.

Also, the present invention is directed to an image reader device comprising: an image pickup device which is controllably exposed to an object to produce an image signal of the object; a mover which moves the object and the image pickup device relative to each other; a storage operable to store an image signal; a writing device which is operable to write an image signal in the storage; a reading device which is operable to read an image signal from the storage; a detector which detects the operation state of the reading device; and a controller which allows an exposure of the image pickup device when the reading device is detected to be in the reading operation, and allows the writing device to write an image signal produced in the exposure in the storage after the reading device is detected to complete the reading operation.

The writing device may be made to write an image signal produced in an exposure executed after a reading operation of the reading device is completed.

Further, the present invention is directed to a method for reading an image of an object by use of an image reader apparatus including an image pickup device, a storage, a writing device, and a reading device, comprising the steps: exposing the image pickup device to the object to produce an image signal of the object; writing an image signal in the storage; reading an image signal from the storage; moving the object and the image pickup device relative to each other; detecting the operation state of the writing device and the reading device after the relative movement is completed; and controlling the exposure of the image pickup device in accordance with the operation state of the reading or writing device.

Furthermore, the present invention is directed to an image reader apparatus comprising: an image pickup device which is controllably exposed to an object to produce an image signal of the object; a mover which moves the object and the image pickup device relative to each other; a storage operable to store an image signal; a writing device which is operable to write an image signal in the storage; a reading device which is operable to read an image signal from the storage; a discriminator which discriminates whether a relative movement is executed between the object and the image pickup device; and a controller which controls at least one of the writing and reading devices to perform at least one of writing and reading of image signal during a relative movement.

Furthermore, the present invention is directed to an image reader device comprising: an image pickup device which is controllably exposed to an object to produce an image signal of the object; a mover which moves the object and the image pickup device relative to each other; a storage operable to store an image signal; a writing device which is operable to write an image signal in the storage; a reading device which is operable to read an image signal from the storage; a discriminator which discriminates whether a relative movement is executed between the object and the image pickup device; and a detector which detects the operation state of the reading device; a first controller which controls at least one of the writing and reading devices to perform at least one of writing and reading of image signal during a relative movement; and a second controller which controls the image pickup device to be exposed to the object when the reading device is detected to be in the reading operation.

Moreover, the present invention is directed to a method for reading an image of an object by use of an image reader apparatus including an image pickup device, a storage, a writing device, and a reading device, comprising the steps: exposing the image pickup device to the object to produce an image signal of the object; moving the object and the image pickup device relative to each other; and performing writing or reading of an image signal in or from the storage during a relative movement.

According to the present invention, it is discriminated whether one of the writing device and the reading device is in operation. The exposure of the image pickup device is controlled in accordance with a result of the discriminator. Also, at least one of writing and reading of an image signal is performed during a relative movement of the object and the image pickup device. Accordingly, the entire object image can be read in a shorter time.

In the case that the image pickup device is exposed after an intermittent relative movement is completed or the writing and the reading is completed, an accurate object image reading can be reliably carried out.

Also, in the case that the image pickup device is exposed when the reading device is executing the reading operation and an image signal is written after the reading operation is completed, the reading of an entire object image can be carried out in more shorter time.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
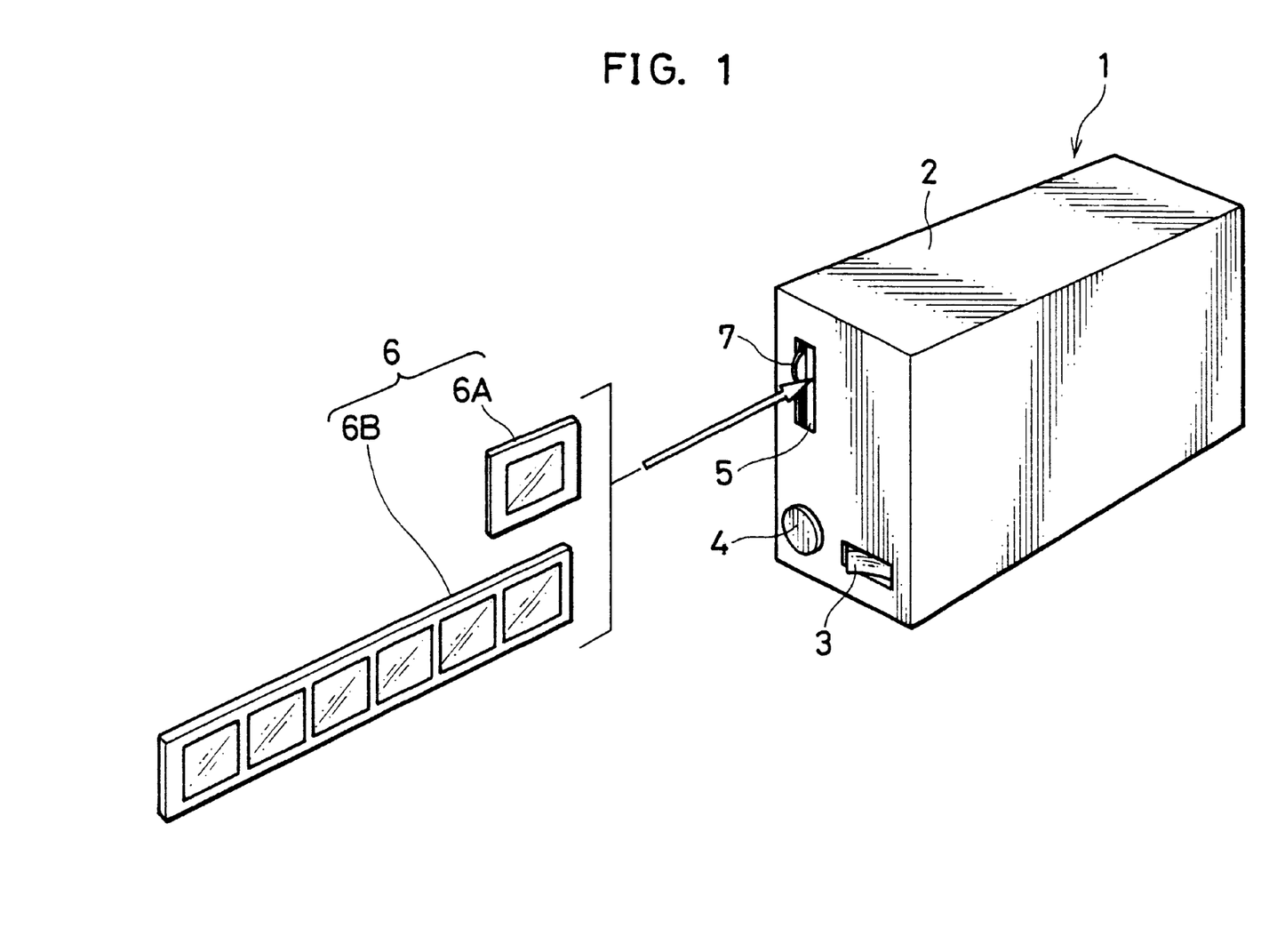
FIG. 1 is a perspective view showing an exterior of an image reader apparatus according to the present invention.

One embodiment of the present invention is described in detail with reference to the accompanying drawings. FIG. 1 is a perspective view showing an exterior of an exemplary image reader apparatus according to the invention.

An image reader apparatus 1 includes a housing 2. In the front surface of the housing 2, a power switch 3 and a focus adjustment button 4 are juxtaposed at the bottom, and an insertion slot 5 for an object is formed above the focus adjustment button 4. In this embodiment, a developed film 6 (a positive film 6A mounted on a positive carrier or a negative film 6B mounted on a negative carrier) as an object is inserted through the insertion slot 5. A shutter 7 which can be opened and closed is provided at the slot 5 so as to block entry of extraneous matters. The focus adjustment button 4 is operated to adjust a focus of a lens for focusing a light image of the film 6 inserted through the slot 5 on a sensing surface of a CCD line sensor to be described later.

Figure 2:
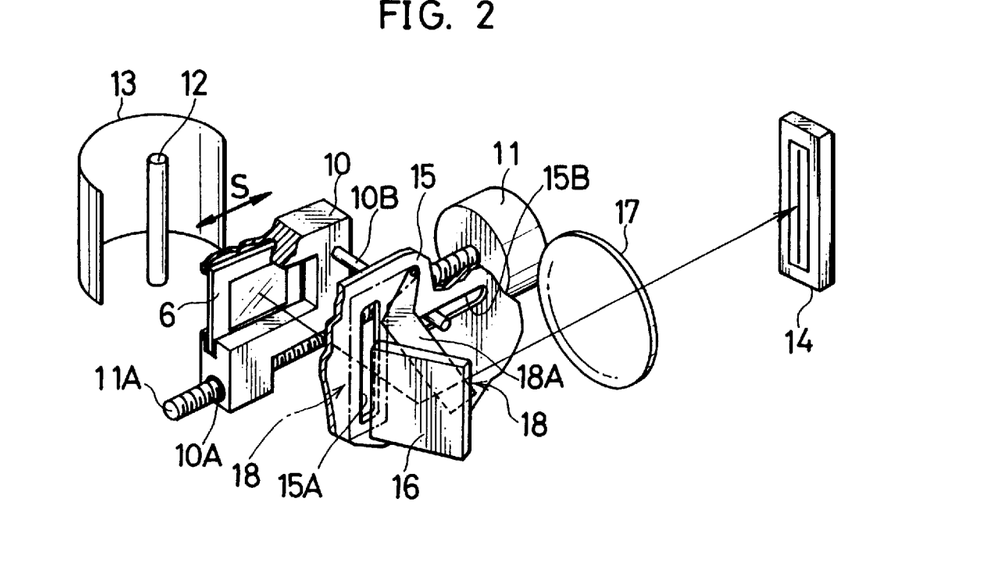
FIG. 2 is a perspective view showing a main mechanism provided in the image reader apparatus.

FIG. 2 is a perspective view of a main mechanism provided in the image reader apparatus 1. In a position facing the insertion slot 5 within the image reader apparatus 1 shown in FIG. 1, there is provided a carriage 10 for setting the film 6 inserted through the slot 5. The carriage 10 is movable in reciprocating fashion in directions toward and away from the insertion slot 5 (directions S in FIG. 2) by being driven by a pulse motor 11. Specifically, a nut portion 10A is formed at the bottom of the carriage 10, and a drive shaft 11A, a threaded bar, of the pulse motor 11 is spirally engaged with the nut portion 10A. Accordingly, as the drive shaft 11A rotates in a forward or reverse direction according to the rotation of the pulse motor 11, the nut portion 10A linearly moves along the drive shaft 11A. As a result, the carriage 10 moves in reciprocating fashion in the directions S.

In a specified position on the left side of the carriage 10 in FIG. 2, there are provided a light source 12 including a fluorescent lamp for continuously illuminating the film 6 set in the carriage 10, and semicylindrically shaped reflector 13 for reflecting the light from the light source 12 toward the film 6. Further, in a specified position on the right side of the carriage 10 in FIG. 2, there is provided a CCD line sensor 14 (hereinafter, CCD 14) as an image pickup device which reads a film image by being exposed to the light transmitted through the film 6. Between the carriage 10 and the CCD 14, there are arranged, along the propagation of the light transmitted through the film 6, a light blocking plate 15 for blocking the light transmitted through the film 6, a mirror 16 for introducing a light image representing the film image to the CCD 14, and a lens 17 for focusing the light image on the CCD 14.

In this embodiment, the CCD 14 is a color line sensor in which three line sensors each including a multitude of photoelectric conversion elements (hereinafter, pixels) linearly arranged along a line are arranged side by side. The respective lines are provided with color filters of red (R), green (G) and blue (B) so that the film image can be read while being separated into color components of R, G and B for each line. Each line sensor includes a photoelectric conversion portion for storing charges corresponding to an amount of incident light, and a transfer portion for reading the stored charges. A black reference output portion for outputting a reference black level is provided at a base end of the photoelectric conversion portion (an end portion where the leading pixel is arranged when light reception signals of the respective pixels (hereinafter, pixel signals) are read). Further, a signal output portion for outputting a signal representing the read film image is provided in an intermediate portion. The pixels in the black reference output portion are masked, whereas those in the signal output portion are provided with color filters.

In a position of the light blocking plate 15 facing the light source 12, there is formed a slit-like exposure window 15A. The light image formed by the light emitted from the light source 12 and transmitted through the film 6 is divided into slit light images by the exposure window 15A and introduced to the CCD 14. A substantially L-shaped shutter member 18 for closing the exposure window 15A when the film 6 is not set in the carriage 10 is pivotally mounted on the light blocking plate 15.

The shutter member 18 opens the exposure window 15A when the carriage 10 is in a reading position away from a detachment position of the film 6 (a closest position to the insertion slot 5). On the other hand, when the carriage 10 is in the detachment position of the film 6, the shutter member 18 is pushed toward the exposure window 15A by the leading end of a lever 10B projecting from the carriage 10 inserted into a horizontal slot 15B formed in the light blocking plate 15, thereby closing the exposure window 15A by a light blocking portion 18A (a state indicated by phantom line). As a result, the light transmitted through the film 6 is completely blocked.

Figure 3:
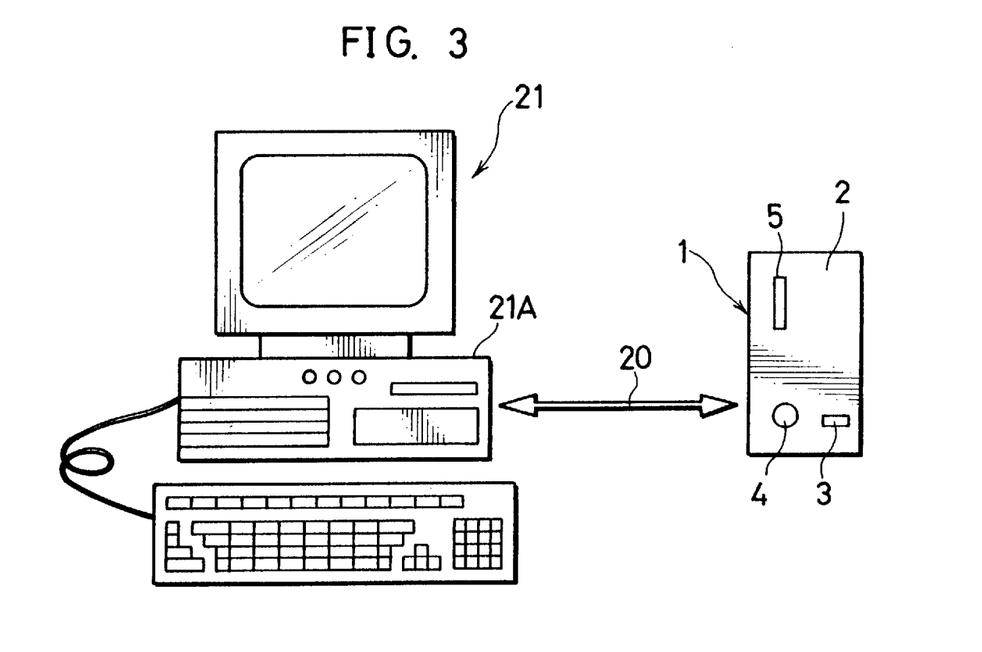
FIG. 3 is a front view showing an example of a manner use the image reader apparatus, the image reader apparatus being connected with a computer.

The thus constructed image reader apparatus 1 functions as peripheral equipment for supporting image processing in a computer. The apparatus 1 is connected with a controlling unit 21A of a computer 21 via an SCSI cable 20 as shown in FIG. 3, and reads the image of the film 6 in accordance with a command from the computer 21. In other words, when it is necessary to read the film image during the image processing by the computer 21, the computer 21 outputs an image data request command to the apparatus 1, thereby causing the apparatus 1 to read the image of the film 6. The image of the film 6 is read as follows. The carriage 10 having the film 6 set therein is moved to a specified initial position where the image can be read, and the image of the film 6 divided into the slit images through the exposure window 15A is focused on the CCD 14. Then, charges are stored in the photoelectric conversion portion of the CCD 14, and the stored charges are read via the transfer portion. Specified signal processings are applied to the image signal read from the CCD 14, and the thus obtained image data is transferred to the computer 21, thereby completing the reading of the imaged at a for one line of the film image. Thereafter, each time the reading of one line of the image data is completed, the film 6 is moved by a specified distance corresponding to one line, and the image data is repeatedly transferred in the same manner as above to complete the reading of one frame of film image.

Figure 4:
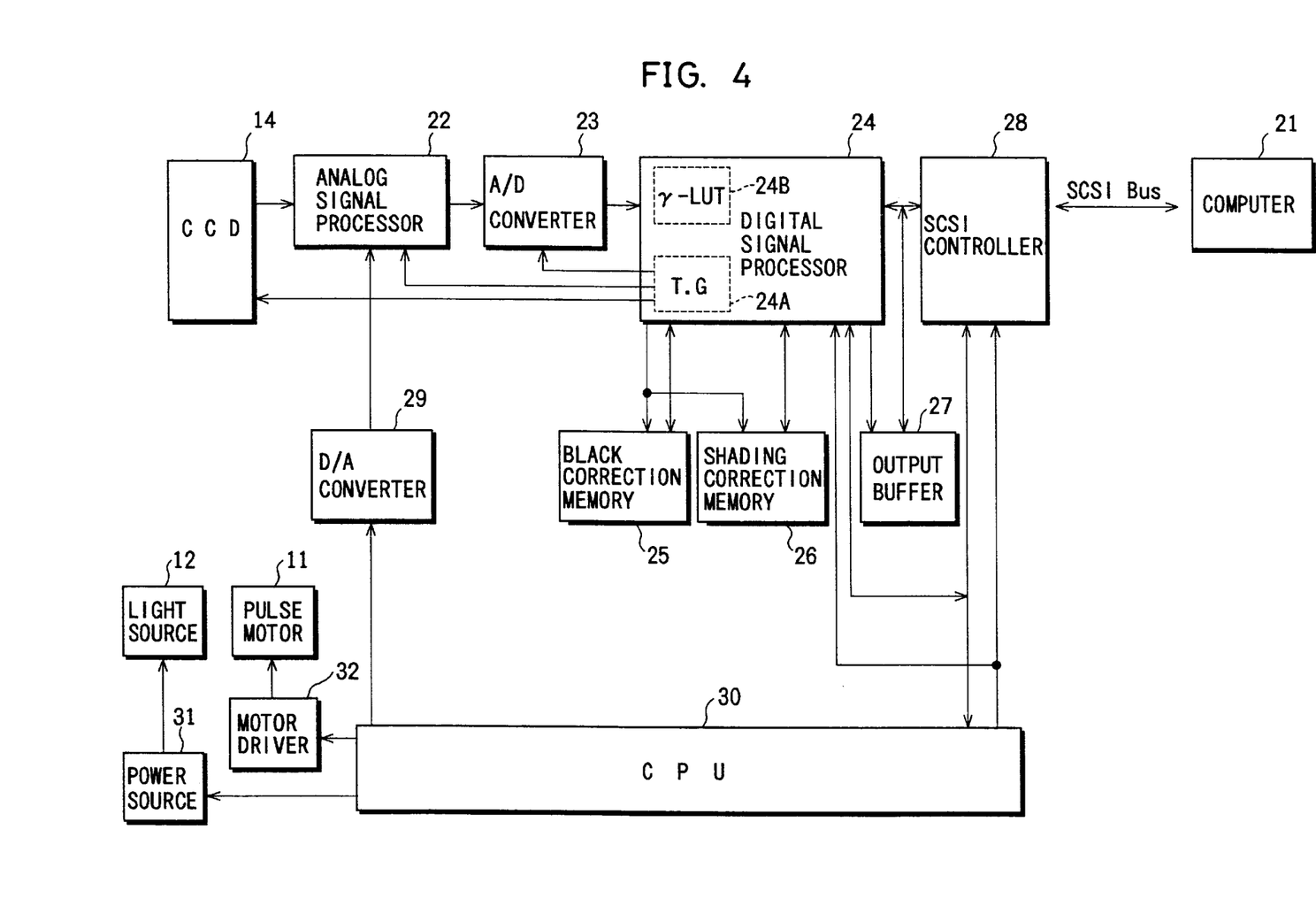
FIG. 4 is a block diagram showing an image reading control of the image reader apparatus.

FIG. 4 is a function block diagram showing an image reading control of the image reader apparatus 1. It should be appreciated that elements identical to those shown in FIG. 2 are identified by the same reference numerals.

Specified signal processings such as a gain adjustment and a clamping level adjustment (black level adjustment) are applied to the respective color component image signals (analog signals) of R, G and B read from the CCD 14 in a n analog signal processor 22. The thus obtained analog signal s are converted into digital signals by an analog-to-digital (A/D) converter 23. Specified signal processings such as a γ correction and a shading correction are applied to the digitalized color component image signals (hereafter, image data ) in a digital signal processor 24.

The digital signal processor 24 is provided internally with a timing generator 24A (identified by T. G in FIG. 2). The processor 24 applies the specified signal processing to the respective image signals constituting the image data by outputting synchronization lock so and a variety of pulses generated in the timing generator 24A to the analog signal processor 22 and the A/D converter 23. The processor 24 is also provided internally with a memory 24B (identified by γ-LUT (look-up table) in FIG. 4) for storing data used for the γ correction, and externally with a memory 25 (identified by a black correction memory in FIG. 4) for storing data used for the black level correction and a memory 26 (identified by a shading correction memory in FIG. 4) for storing data used for the shading correction. The black level, gradation and shading are adjusted using the data stored in the memories 24B, 25 and 26. The image data processed in the digital signal processor 24 is written in an output buffer 27 to be temporarily stored therein, and is transferred to the computer 21 via the SCSI cable 20 in accordance with a control signal from an SCSI controller 28.

A digital-to-analog (D/A) converter 29 in FIG. 4 converts digital signals, which represent a gain and a clamping level of the analog signal processor 22 and are output from a controller 30, into analog signals. An inverting power source 31 generates a power to be supplied to the light source 12 including a fluorescent lamp, and controllably turns on and off the light source 12 by controlling a power supply in accordance with a control signal from the controller 30. A motor driver 32 controls the driving of the pulse motor 11, and causes the pulse motor 11 to rotate in the forward or reverse direction at a specified speed in accordance with the control signal from the controller 30.

The SCSI controller 28 controls a data communication with the computer 21. The SCSI controller 28 causes the controller 30 to perform the image reading by outputting an image data request command from the computer 21 to the controller 30, and successively transfers the read image data to the computer 21 while communicating with the computer 21. The controller 30 (identified as a CPU in FIG. 4) centrally controls the image reading. The controller 30 reads the film image and successively transfers the read image data to the computer 21 via the SCSI controller 28 by controllably driving the digital signal processor 24, the inverting power source 31 and the motor driver 32.

Figure 5:
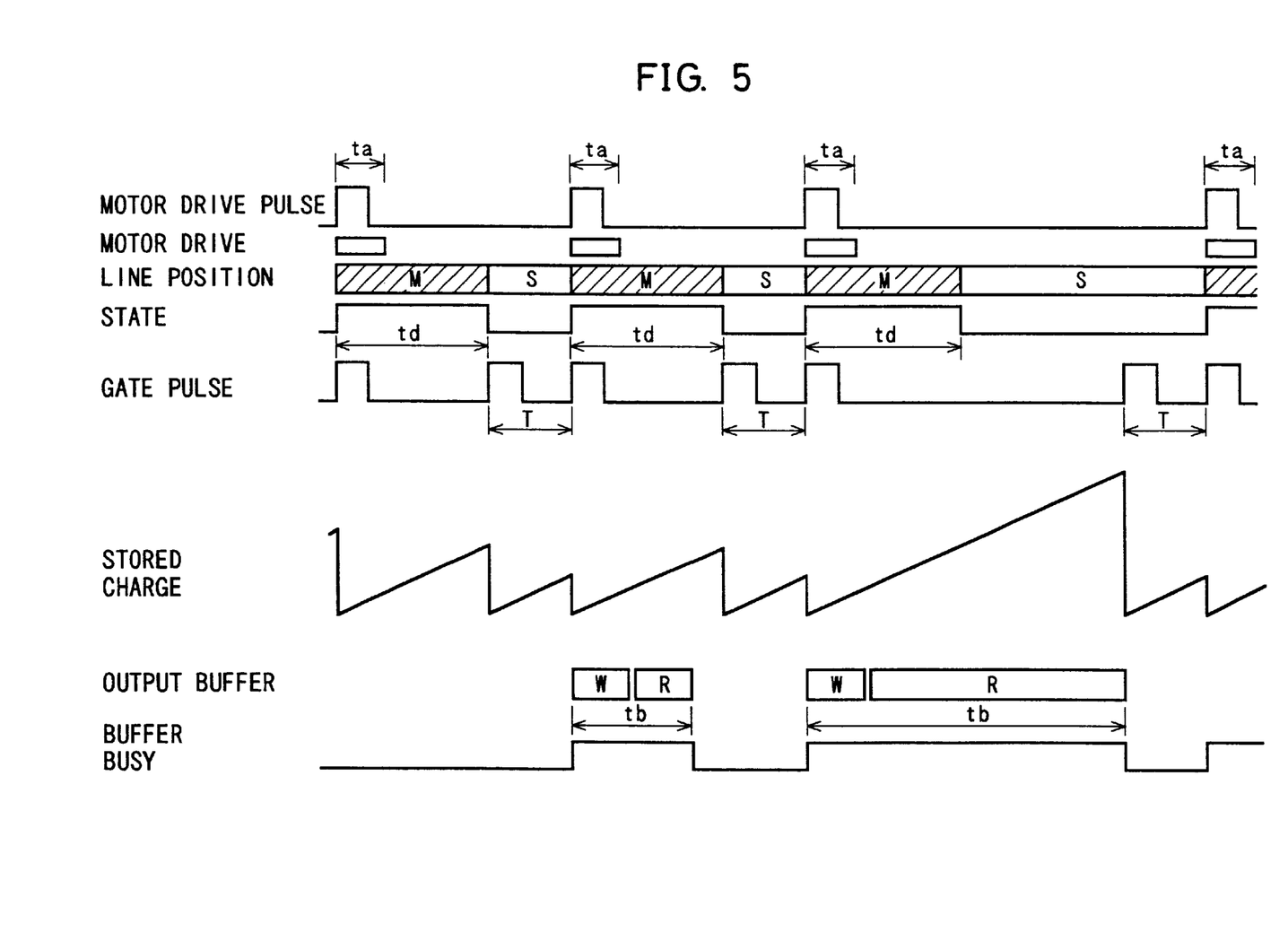
FIG. 5 is a timing chart showing one operation of the image reader apparatus.

FIG. 5 is a timing chart showing an operation of the image reader apparatus 1 based on an image reading control function.

Before the image of the object is read, necessary setup processing such as a black level correction and shading correction for eliminating a variation in the light amount and color balance due to changes of the light source and CCD over time, a data calculation processing necessary in the case that images recorded in a negative film are read, and other necessary processing are assumed to have been already performed.

Upon receipt of the image data request command from the computer 21, the controller 30 sends a motor drive pulse signal to the motor driver 32 so as to move the carriage 10 having the film 6 set therein to the initial position where the image can be read by the CCD 14. Upon receipt of this pulse signal, the motor driver 32 rotates the pulse motor 11. Upon detecting the arrival of the carriage 10 to the initial position, an unillustrated initial position detector outputs a detection signal to the controller 30, which in turn outputs a stop signal to the motor driver 32. As a result, the driving of the pulse motor 11 is stopped.

Subsequently, the controller 30 inverts a state signal output therefrom from "low" to "high" and, upon rise of the state signal, outputs the motor drive pulse signal so as to move the carriage 10 by the specified distance corresponding to one line of the CCD 14. Upon receipt of this motor drive pulse signal, the motor driver 32 drivingly rotates the pulse motor 11 for a period ta necessary for the carriage 10 to move the specified distance. However, since the pulse motor 11 continues to vibrate for a very short period even after its rotation is stopped, it cannot be brought into a stable state until a period td including the driving period ta elapses. The period td is determined by the pulse motor and the load. In this embodiment, the period td is assumed to be substantially a moving time of the object.

The period td may be set based on a time required for the pulse motor 11 to be actually brought into a non-vibrating state, or may be set slightly longer than the above time for better safety. Alternatively, the period td may be such that it elapses while the pulse motor 11 is still vibrating to a very small degree, provided it does not cause unsharpness in the read image. The state signal is so set as to be "high" during the moving period td of the carriage 10. Even if the CCD 14 is exposed to the light image during the moving period td, the image can only be read with a reduced accuracy.

Since the transmission light from the light source 12 is incident on the CCD 14 even during the moving period td, charges are stored in the CCD 14. However, the state signal output from the controller 30 becomes "low" upon lapse of the moving period td and, in this moment, the controller 30 outputs a CCD shift gate pulse and the charges stored in the photoelectric conversion portion of the CCD 14 are transferred to the transfer portion. Although the charges transferred to the transfer portion are read, the A/D converter 23 and other devices do not operate based on this data. Accordingly, no charge is stored in the photoelectric conversion portion of the CCD 14 when the moving period td elapses, and charges are newly stored upon start of the exposure. In other words, when the state signal is "low", the carriage 10 is stably stopped. In this embodiment, since the exposure is made in the stable state, the image can be read with an improved accuracy.

Upon lapse of a specified exposure time T after the exposure, the state signal becomes "high" and, upon rise of the state signal, the controller 30 outputs a next motor drive pulse signal, with the result that the pulse motor 11 is rotated and the carriage 10 is moved by the specified distance. At this time, the CCD shift gate pulse is simultaneously output, and the charges stored in the photoelectric conversion portion of the CCD 14 are transferred to the transfer portion. The charges transferred to the transfer portion are read in the form of an analog signal which is subjected to specified signal processing such as a gain adjustment in the analog signal processor 22 and is converted into a digital signal in the A/D converter 23.

The thus obtained digital signal is subjected to the specified signal processing such as γ correction in the digital signal processor 24, and is written in the output buffer 27 as an image data for one line. The output buffer 27 is a high speed memory and is adapted to temporarily store the data so as to measure a data transfer timing to the computer 21 having an unfixed transfer time due to implementation of other interrupt routines. Upon completion of the writing of the image data for one line in the output buffer 27, the controller 30 transfers the image data in response to a request from the computer 21 via the SCSI controller 28. In the timing chart, "W" in the output buffer 27 indicates that the image data is being written, whereas "R" therein indicates that the image data is being read and transferred to the computer 21.

A buffer busy signal output from the digital signal processor 24 is "high" while the image data is written ("W") or read ("R") in or from the output buffer 27, and becomes "low" when the output buffer 27 is brought into a state where a new image data can be written after completion of transfer of the image data. It should be noted that tb denotes a period during which the buffer busy signal is "high", i.e. during which the image data is written in or read from the output buffer 27.

When the state signal changes from "high" to "low", the control of the controller 30 differs depending upon whether the buffer busy signal is "low" or "high". Specifically, if the buffer busy signal is "low" when the state signal changes from "high" to "low", the controller 30 outputs the CCD shift gate pulse as described above so that an exposure is conducted during the specified exposure time. This is because, when the buffer busy signal is "low", a new image data can be written in the output buffer 27 after completion of transfer of the image data. On the other hand, if the buffer busy signal is "high" when the state signal changes from "high" to "low", the controller 30 does not output the CCD shift gate pulse and, therefore, no exposure is conducted.

This is because, when the buffer busy signal is "high", the data transfer to the computer 21 has not yet been completed and, therefore, the image data obtained by reading and digitalizing the charges stored in the CCD 14 cannot be written in the output buffer 27. However, charges are being stored since the transmission light from the light source 12 is constantly incident on the CCD 14 so long as the light source 12 is driven.

Accordingly, in this case, when the buffer busy signal changes from "high" to "low", the controller 30 outputs the CCD shift gate pulse to discharge unnecessary charges stored in the CCD 14. At this moment, the exposure necessary to read the image is started. In other words, an exposure timing of the CCD 14 is changed depending upon which of the moving period td of the carriage 10 and the writing or reading period tb in or from the output buffer 27 is longer. Upon lapse of the exposure time T, the CCD shift gate pulse is output and the charges stored in the photoelectric conversion portion of the CCD 14 are transferred to the transfer portion. The charges transferred to the transfer portion are read in the form of an analog signal which is subjected to specified signal processings such as a gain adjustment in the analog signal processor 22 and is converted into a digital signal in the A/D converter 23. The converted digital signal is written in the output buffer 27 as an image data for one line as described above, and the image data is transferred to the computer 21.

As described above, it is necessary to change the control of the controller 30 because a time required to read the image data written in the output buffer 27 varies depending upon the data transfer ability of the computer 21 in each moment, i.e. this time cannot be fixed. The image data for the respective lines are successively transferred to the computer 21 to complete the transfer of one frame of the film image.

In the image reader apparatus which operates as above, upon completion of the movement of the object by the specified distance corresponding to one line of the CCD 14, it is discriminated whether the image data is being written in or read from the output buffer 27. When the output buffer 27 is not in operation upon completion of the movement of the object, the CCD 14 is exposed. On the other hand, when the output buffer 27 is in operation upon completion of the movement of the object, the CCD 14 is exposed after the operation of the output buffer 27. Since at least the image signal obtained by the exposure is written in the output buffer 27 at the same time when the object is moved, the time required to read the image of the entire object can be shortened.

Figure 6:
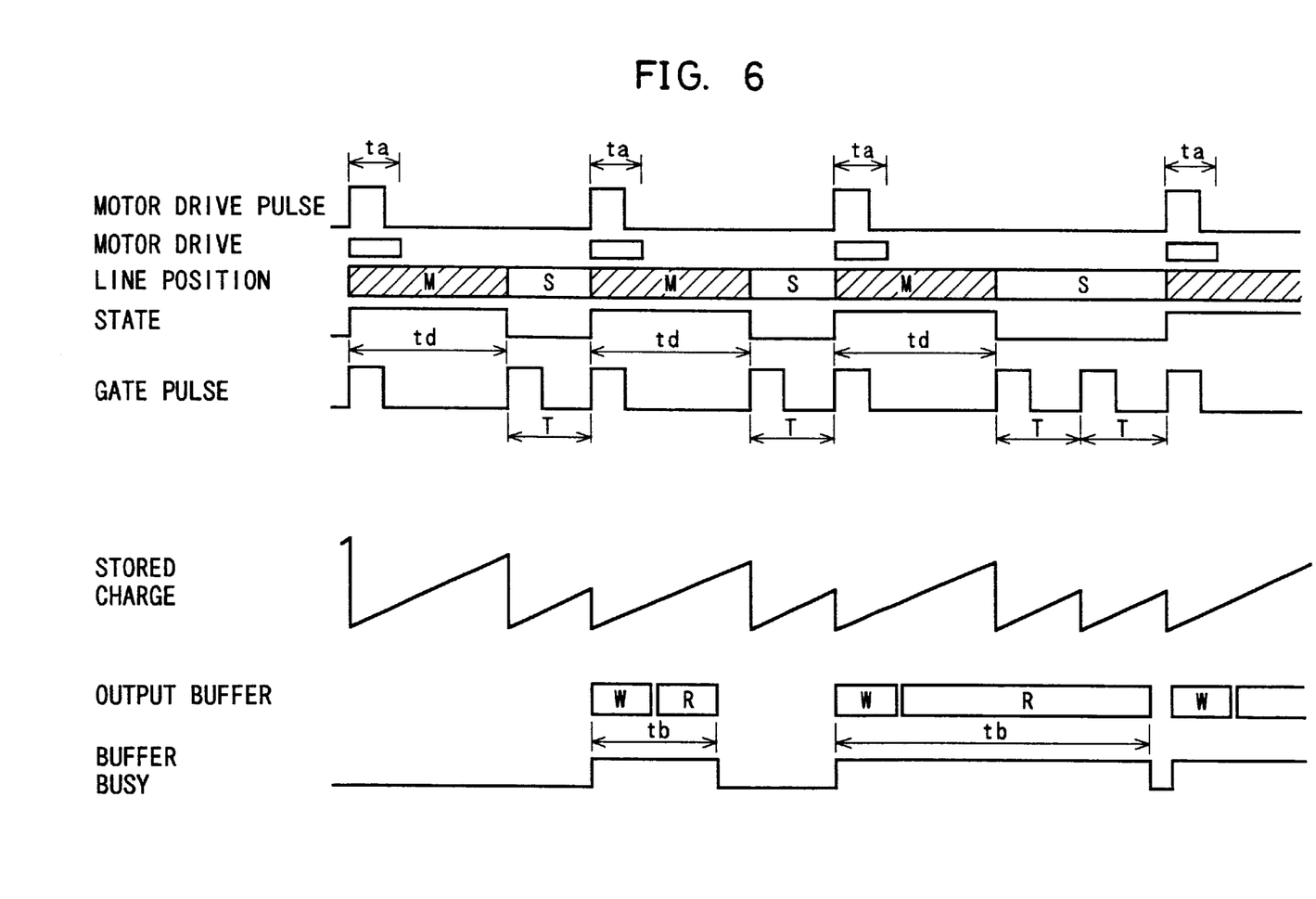
FIG. 6 is a timing chart showing another operation of the image reader apparatus.

FIG. 6 is a timing chart showing another operation of the image reader apparatus 1. Description is given only where this timing chart differs from the timing chart of FIG. 5. In the operation shown in FIG. 6, if the buffer busy signal is "low" when the state signal changes from "high" to "low", the CCD shift gate pulse is output, similar to the operation shown in FIG. 5, to discharge the charges stored in the CCD 14 and then conduct an exposure during the specified exposure time T. If the buffer busy signal is "high" when the state signal changes from "high" to "low", the CCD shift gate pulse is repeatedly output during a specified time T which is the same as the exposure time T. Accordingly, the exposure and the discharge of charges are alternately and repeatedly conducted during the same time as the original exposure. Treating the exposure conducted when the buffer busy signal changes from "high" to "low" as the original exposure, charges stored during this exposure are read in the form of an analog signal and written in the output buffer 27 as an image data. The state signal changes from "low" to "high" when the charges stored during the original exposure are read. Upon rise of the state signal, a motor drive pulse signal is output to drive the pulse motor 11. At the same time, the buffer busy signal changes from "low" to "high" because the output buffer 27 starts operating.

In the image reader apparatus which operates as above, the CCD 14 is exposed when the output buffer 27 is not in operation upon completion of the movement of the object. On the other hand, when the output buffer 27 is in operation upon completion of the movement of the object, the CCD 14 is repeatedly exposed during the specified exposure time. The exposure timing is changed so that the exposure being conducted when the operation of the output buffer 27 is completed can be treated as the original exposure. Accordingly, the time required to read the image of the entire object can be more shortened in this operation than in the operation shown in FIG. 5 in which the exposure is started after completion of the operation of the output buffer 27.

Although the object such as a film is moved with respect to the CCD line sensor in the foregoing embodiments, the object may be fixed and the CCD line sensor may be moved with respect to the object. In other words, the object and the CCD line sensor only need to be movable relative to each other. The CCD line sensor adopted in the foregoing embodiments may be other type of line sensor. Further, other details may be changed if necessary.

As described above, upon completion of the relative movement of the object by the specified distance corresponding to one line of the line sensor, it is discriminated whether the image signal is being written in or read from a storage for temporarily storing the image signal. The line sensor is exposed at an exposure timing which is changed based on the discrimination result. Since at least the image signal obtained by the exposure is written in the storage at the same time when the object is moved, the time required to read the image of the entire object can be shortened.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image reader apparatus comprising:
    an image pickup device which is controllably exposed to an object to produce an image signal of the object;
    a mover which moves the object and the image pickup device relative to each other;
    a storage operable to store an image signal;
    a writing device which is operable to write an image signal in the storage;
    a reading device which is operable to read an image signal from the storage;
    a discriminator which discriminates whether one of the writing device and the reading device is in operation; and
    a controller which controls the exposure of the image pickup device in accordance with a result of the discriminator.

2. An image reader apparatus as defined in claim 1, wherein: the mover intermittently moves the object relative to the image pickup device by a specified interval; and the image pickup device is exposed after an intermittent relative movement is completed.

3. An image reader apparatus as defined in claim 2, wherein the controller allows the image pickup device to be exposed: i) after an intermittent relative movement is completed when the discriminator discriminates that one of the writing device and the reading device is not in operation; and ii) after one of the writing and the reading is completed when the discriminator discriminates that one of the writing device and the reading device is in operation.

4. An image reader apparatus as defined in claim 1, wherein the writing device writes an image signal in the storage during an intermittent relative movement.

5. An image reader apparatus as defined in claim 1, wherein the object is film and the image pickup device includes a line sensor.

6. An image reader apparatus as defined in claim 2, wherein the controller allows the image pickup device to be exposed after an intermittent relative movement is completed or after one of the writing and the reading is completed, whichever transpires later in time.

7. An image reader apparatus as defined in claim 6, wherein the image pickup device comprises a charge accumulating device, and the charge accumulating device commences accumulating charge after the relative movement is completed or after one of the writing and the reading is completed, whichever transpires later in time.

8. An image reader apparatus as defined in claim 1, wherein the reading device performs its reading operation in a non-fixed period of time.

9. An image reader device comprising:
    an image pickup device which is controllably exposed to an object to produce an image signal of the object;
    a mover which moves the object and the image pickup device relative to each other;
    a storage operable to store an image signal;
    a writing device which is operable to write an image signal in the storage;
    a reading device which is operable to read an image signal from the storage;
    a detector which detects the operation state of the reading device; and
    a controller which allows an exposure of the image pickup device when the reading device is detected to be in the reading operation in accordance with a result of the detector, and allows the writing device to write an image signal produced in the exposure in the storage after the reading device is detected to complete the reading operation.

10. An image reader device as defined in claim 9, wherein:
    the mover intermittently moves the object relative to the image pickup device by a specified interval; and
    the image pickup device is exposed after an intermittent relative movement is completed.

11. An image reader device as defined in claim 9, wherein the writing device writes an image signal produced in an exposure executed after a reading operation of the reading device is completed.

12. An image reader device as defined in claim 10, wherein the image pickup device comprises a charge accumulating device, and the charge accumulating device commences accumulating charges after the relative movement is completed.

13. An image reader device as defined in claim 12, wherein the controller allows the charge accumulating device to accumulate charge for a time period T, and following said period T, the controller allows the accumulating device to accumulate charge for another period T if said reading device is detected to be in the reading operation and allows the writing device to write image signals into the storage if the reading device is detected to have completed the reading operation.

14. An image reader device as defined in claim 9, wherein the reading device performs its reading operation in a non-fixed period of time.

15. A method for reading an image of an object by use of an image reader apparatus including an image pickup device, a storage, a writing device, and a reading device, comprising the steps of:

exposing the image pickup device to the object to produce an image signal of the object;

writing an image signal in the storage;

reading an image signal from the storage;

moving the object and the image pickup device relative to each other;

detecting the operation state of the writing and reading devices after the relative movement is completed; and controlling the operation state of the image pickup device in accordance with the operation state of the reading or writing device.

16. A method for reading an image as defined in claim 15, wherein the controlling step comprises allowing the image pickup device to be exposed after an intermittent relative movement between the object and the image pickup device is completed or after one of the writing and the reading steps is completed, whichever transpires later in time.

17. A method for reading an image as defined in claim 16, wherein the image pickup device comprises a charge accumulating device, and the step of exposing the image pickup device comprises commencing accumulating charge after the relative movement is completed or after one of the writing and the reading steps is completed, whichever transpires later in time.

18. A method for reading an image as defined in claim 15, wherein the controlling step comprises allowing the image pickup device to be exposed during said reading step.

19. A method for reading an image as defined in claim 18, wherein said image pickup device comprises a charge accumulating device, and said controlling step comprises allowing the charge accumulating device to accumulate charge for a time period T, and following said period T, allowing the accumulating device to accumulate charge for another period T if it is detected that the reading operation is in progress and allowing the writing step to proceed if it is detected that the reading operation has finished.

20. A method for reading an image as defined in claim 15, wherein the reading step is performed in a non-fixed period of time.

21. An image reader apparatus comprising:

an image pickup device which is controllably exposed to an object to produce an image signal of the object;

a mover which moves the object and the image pickup device relative to each other;

a storage operable to store an image signal;

a writing device which is operable to write an image signal in the storage;

a reading device which is operable to read an image signal from the storage;

a discriminator which discriminates whether a relative movement is executed between the object and the image pickup device; and a controller which controls at least one of the writing and reading devices to perform at least one of writing and reading of image signal during a relative movement, wherein the image pickup device is exposed after a relative movement is completed, and wherein the controller allows the image pickup device to be exposed after a relative movement is completed or after one the writing and the reading is completed, whichever transpires later in time.

22. An image reader apparatus as defined in claim 21, wherein the mover intermittently moves the object relative to the image pickup device by a specified interval.

23. An image reader apparatus as defined in claim 21, wherein the image pickup device is exposed after a relative movement is completed and at least one of the writing and the reading is completed.

24. An image reader apparatus as defined in claim 21, wherein the image pickup device is exposed after a relative movement is completed and both of the writing and the reading is completed.

25. An image reader apparatus as defined in claim 21, wherein the controller controls the writing device to write an image signal in the storage during a relative movement.

26. An image reader apparatus as defined in claim 21, wherein the controller controls the reading device to read an image signal from the storage during a relative movement.

27. An image reader apparatus as defined in claim 21, wherein the object is film and the image pickup device includes a line sensor.

28. An image reader apparatus as defined in claim 21, wherein the image pickup device comprises a charge accumulating device, and the charge accumulating device commences accumulating charge after the relative movement is completed or after one of the writing and the reading is completed, whichever transpires later in time.

29. An image reader apparatus as defined in claim 21, wherein the reading device performs its reading operation in a non-fixed period of time.

30. An image reader device comprising:

an image pickup device which is controllably exposed to an object to produce an image signal of the object;

a mover which moves the object and the image pickup device relative to each other;

a storage operable to store an image signal;

a writing device which is operable to write an image signal in the storage;

a reading device which is operable to read an image signal from the storage;

a discriminator which discriminates whether a relative movement is executed between the object and the image pickup device; and a detector which detects the operation state of the reading device;

a first controller which controls at least one of the writing and reading devices to perform at least one of writing and reading of an image signal during a relative movement; and a second controller which controls the image pickup device to be exposed to the object when the reading device is detected to be in the reading operation.

31. An image reader device as defined in claim 30, wherein the first controller controls the writing device to write an image signal produced in the exposure in the storage after the reading device is detected to complete the reading operation.

32. An image reader device as defined in claim 30, wherein the mover intermittently moves the object relative to the image pickup device by a specified interval.

33. An image reader device as defined in claim 30, wherein the second controller controls the image pickup device to be exposed to the object after a relative movement is completed.

34. An image reader device as defined in claim 30, wherein the image pickup device comprises a charge accumulating device, and the charge accumulating device commences accumulating charges after the relative movement is completed.

35. An image reader device as define in claim 34, wherein the second controller allows the charge accumulating device to accumulate charge for a time period T, and following said period T, the second controller allows the accumulating device to accumulate charge for another period T if said reading device is detected to be in the reading operation and allows the writing device to write image signals into the storage if the reading device is detected to have completed the reading operation.

36. An image reader device as defined in claim 30, wherein the reading device performs its reading operation in a non-fixed period of time.

37. A method for reading an image of an object by use of an image reader apparatus including an image pickup device, a storage, a writing device, and a reading device, comprising the steps of:
    exposing the image pickup device to the object to produce an image signal of the object;
    moving the object and the image pickup device relative to each other; and
    performing writing or reading of an image signal in or from the storage during a relative movement, wherein the exposing of the image pickup device is performed after a relative movement is completed, and wherein the exposing step comprises allowing the image pickup device to be exposed after an intermittent relative movement between the object and the image pickup device is completed or after one of the writing and the reading is completed, whichever transpires later in time.

38. A method for reading an image as defined in claim 37, wherein the image pickup device comprises a charge accumulating device, and the step of exposing the image pickup device comprises commencing accumulating charge after the relative movement is completed or after one of the writing and the reading is completed, whichever transpires later in time.

39. A method for reading an image as defined in claim 37, wherein the exposing step is performed during said reading step.

40. A method for reading an image as defined in claim 39, wherein said image pickup device comprises a charge accumulating device, and said exposing step comprises accumulating charge for a time period T, and following said period T, accumulating charges for another period T if it is detected that the reading operation is in progress and allowing the writing step to proceed if it is detected that the reading operation has finished.

41. A method for reading an image as defined in claim 37, wherein the reading step is performed in a non-fixed period of time.

42. An image reader apparatus comprising:
    an image pickup device which is controllably exposed to an object to produce an image signal of the object;
    a memory which stores an image signal transferred from the image pickup device;
    a discriminator which discriminates whether transfer of an image signal from the image pickup device to the memory is in operation; and
    a controller which controls the timing of next exposure of the image pickup device in accordance with a result of the discriminator.

43. An image reader apparatus as defined in claim 42, wherein when transfer of an image signal is discriminated to be in operation, the controller controls the image pickup device to start exposure after completion of the transfer.

44. An image reader apparatus as defined in claim 42, wherein when transfer of an image signal is discriminated to be in operation, the controller controls the image pickup device to execute exposure during the transfer.

45. An image reader apparatus as defined in claim 42, wherein when transfer of an image signal is discriminated not to be in operation, the controller controls the image pickup device to start exposure at a predetermined timing.

* * * * *